United States Patent
Bond et al.

(10) Patent No.: US 6,796,188 B2
(45) Date of Patent: Sep. 28, 2004

(54) FLOW METER

(75) Inventors: Derek F. Bond, Chichester (GB); Colin Bowdery, Oxfordshire (GB); Richard Hiley, Oxfordshire (GB); Andrew Beggin, Oxfordshire (GB)

(73) Assignee: Ambic Equipment Limited, Oxfordshire (GB)

( * ) Notice: Subject to any disclaimer, the term of this patent is extended or adjusted under 35 U.S.C. 154(b) by 0 days.

(21) Appl. No.: 10/656,262

(22) Filed: Sep. 8, 2003

(65) Prior Publication Data

US 2004/0045367 A1 Mar. 11, 2004

(30) Foreign Application Priority Data

Sep. 6, 2002 (GB) .............................................. 0220724

(51) Int. Cl.$^7$ ................................................. G01F 1/74
(52) U.S. Cl. ................................................... 73/861.04
(58) Field of Search ......................... 73/219, 215, 816, 73/861, 220, 223, 861.04

(56) References Cited

U.S. PATENT DOCUMENTS

| | | |
|---|---|---|
| 4,346,596 A | 8/1982 | Diamant et al. |
| 4,391,222 A | 7/1983 | Icking et al. |
| 5,083,459 A | 1/1992 | Lind et al. |
| 5,635,637 A * | 6/1997 | Boult et al. ................... 73/223 |
| 6,324,906 B1 * | 12/2001 | Rinkewich et al. ........... 73/219 |
| 6,508,109 B2 * | 1/2003 | van den Berg ............ 73/64.56 |

FOREIGN PATENT DOCUMENTS

EP  0 424 801  5/1991

* cited by examiner

*Primary Examiner*—Edward Lefkowitz
*Assistant Examiner*—Jewel Thompson
(74) *Attorney, Agent, or Firm*—Young & Thompson

(57) ABSTRACT

A flow meter comprises an inflow chamber having a first fluid inlet, an outflow chamber housed in the inflow chamber and having a second fluid inlet, which is in fluid communication with the inflow chamber, and a fluid outlet by which fluid can drain from the outflow chamber, and a sensing device having a elongate sensor which is positioned at, or adjacent to and downstream of, the second fluid inlet. The second fluid inlet is of limited dimensions so that, in use, a head of fluid is formed in the inflow chamber and the flow rate of the fluid passing through the second fluid inlet is monitored based on the extent of the elongate sensor which is covered by the fluid.

15 Claims, 1 Drawing Sheet

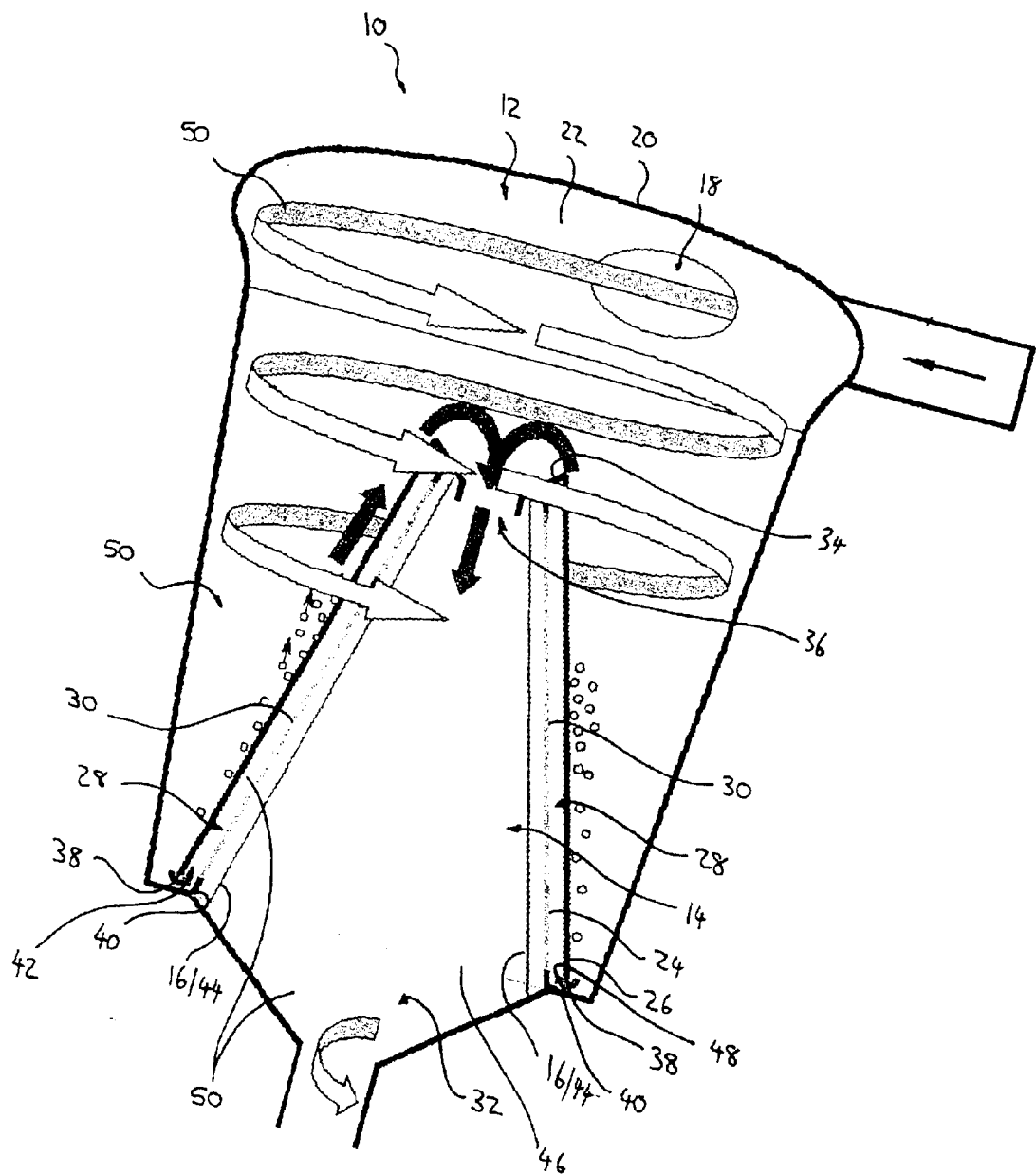

FLOW METER

INTRODUCTION

This invention relates to a flow meter and, in particular but not exclusively, to a flow meter for milk.

Flow meters for determining the flow rate of fluids are known. However, these are typically mechanical arrangements or incorporate mechanical mechanisms which can lead to inaccuracies and failure over time.

Further problems occur when trying to determine the flow rate of milk, since the specific gravity and viscosity of milk varies throughout milking, from cow to cow, and depends on the time of year due to, for example, entrained air, butterfat content, and mastitis.

The entrained air and surface tension of milk can vary considerably. Foaming can occur due to vacuum creation in the lines transporting the milk, and with the formation of slugs. It is desirable to separate or reduce the air from the milk so that volumetric measurements can be made under calm or relatively calm flow conditions.

Furthermore, the conductive and dielectric properties of milk may not only vary from cow to cow, but also may vary during the milking cycle. The constituents of milk exhibit varying impedances when subjected to alternating and direct currents (AC and DC). Milk cannot therefore be measured reliably by measuring bulk conductivity and may, under turbulent flow conditions, appear to become inductive.

The present invention seeks to provide a solution to these problems.

SUMMARY OF THE INVENTION

According to the present invention, there is provided a flow meter comprising an inflow chamber having a first fluid inlet, an outflow chamber housed in the inflow chamber and having a second fluid inlet, which is in fluid communication with the inflow chamber, and a fluid outlet by which fluid can drain from the outflow chamber, and a sensing device having an elongate sensor which is positioned at, or adjacent to and downstream of, the second fluid inlet, the second fluid inlet being of limited dimensions so that, in use, a head of fluid is formed in the inflow chamber and the flow rate of the fluid passing through the second fluid inlet is monitored based on the extent of the elongate sensor which is covered by the fluid.

BRIEF DESCRIPTION OF THE DRAWING

The present invention will now be described, by way of example, with reference to the accompanying FIGURE which is a diagrammatic cross-sectional view of one embodiment of a flow meter, in accordance with the present invention.

DESCRIPTION OF THE PREFERRED EMBODIMENT

Referring to the FIGURE, a flow meter 10 is shown therein. The flow meter 10 has an inflow chamber 12, an outflow chamber 14, and a sensing device 16. The inflow chamber 12 has a first fluid inlet 18 at, or adjacent to, its top surface 20, and is of frusto-conical shape, tapering in a downwards direction. The first fluid inlet 18 is positioned tangentially or substantially tangentially relative to the inner surface 22 of the inflow chamber 12.

The outflow chamber 14 is concentrically housed within the inflow chamber 12 and comprises inner and outer walls 24 and 26 which extend in parallel with each other and which are spaced apart, thus forming a throughflow chamber 28 therebetween. A plurality of spaced second fluid inlets 30 is formed in the inner wall 24, and a fluid outlet 32 is formed in the base of the outflow chamber 14. The second fluid inlets 30 are elongate slits which extend in the direction of the longitudinal extent of the outflow chamber 14, and which are in fluid-communication with the inflow chamber 12. The outflow chamber 14 is central to the housing.

The shapes of the inflow and outflow chambers 12 and 14 are such as to maximise flow capacity in a minimum volume.

The outer wall 26 is joined to the inner wall 24 at the top of the outflow chamber 14 to form a rim 34 which defines an overflow opening 36 into the outflow chamber 14. The outer wall 26 extends to a position at which its lower free-edge 38 is adjacent to, but spaced from, the bottom edge 40 of the inner wall 24, and this opening defines a third fluid inlet 42. The position of the third fluid inlet 42 is designed to inhibit the through-flow of bubbles.

The sensing device 16 has elongate, typically wire, measuring sensors 44 which are positioned symmetrically in the outflow chamber 14, directly adjacent to and in parallel with each elongate slit 30, and an elongate, typically wire, reference sensor 46 which in use is coiled, typically horizontally, around the bottom edge 40 of the inner wall 24 of the outflow chamber 14. The reference sensor 46 is of a length which is proportional to the sum of the lengths of the measuring sensors 44. Each sensor 44 and 46 may be sheathed in an electrically insulating, typically plastics, dielectric covering.

The sensing device 16 also includes an Earth ring member 48 which is located in the base of the throughflow chamber 28. In addition device 16 acts as an Earth.

Wire sensors are beneficial over plate sensors due to their reduced surface area and the fact that fluid is less likely to adhere, or will adhere for shorter periods, to the outer surface of a wire sensor than a plate sensor. This results in improved accuracy of measurements.

As an alternative to wire sensors, elongate strip sensors could be utilised.

The sensing device 16 also includes energising means (not shown) which supplies an alternating current at high frequency, typically from 50 kHz to several MHz but below the frequency range at which molecular resonance may impact the accuracy of the readings, for driving each sensor 44 and 46, and microcomputer-based electronic circuitry (not shown), which includes a display, for monitoring the capacitive impedance, capacitance and/or conductance of the fluid based on the electrical response of the wire sensors 44 and 46, computing results, and displaying a corresponding value. The electronic circuitry is set up so that the energising means drives each sensor 44 and 46 sequentially, thus preventing or minimising any interference therebetween.

The electronic circuitry filters, to reduce noise and sampling errors, and digitises the instantaneous response values from the measuring sensors 44 and reference sensor 46. Further digital filtering, scaling and linearising may then take place in software. To expedite on-line calibration of the flow meter 10, the flow meter 10 may be statically and dynamically calibrated and the resultant values stored in memory of the electronic circuitry. One calibration method typically takes the form of calibrating the fluid flows at known flow rates, and recording the flow measurements whilst taking concurrent load readings of the outflowing fluid. In this way, linearisation and scaling factors may be calculated and concurrently applied to the measurement data such that flow rates and mass flow may be displayed in real time.

To further ensure the highest possible resolution of the sensing device 16, and therefore the most accurate measurements, the overall impendence range of the sensors 44 and 46 are typically matched to the impedance of the fluid being monitored, even though the provision of the reference sensor 46 fully compensates for small changes in fluid impedance during normal operation.

The flow meter 10 normally operates with a partial vacuum in the inflow, outflow and throughflow chambers 12, 14, and 28 and is adapted so that in use a zero or substantially zero pressure differential can exist between the first fluid inlet 18 of the inflow chamber 12 and the fluid outlet 32 of the outflow chamber 14.

In use, the afore-mentioned partial vacuum is first set up between the first fluid inlet 18 of the inflow chamber 12 and the fluid outlet 32 of the outflow chamber 14 to which the vacuum line is connected. Under force from this vacuum, milk 50 is drawn tangentially into the inflow chamber 12 from the first fluid inlet 18. Due to the tangential orientation of the first fluid inlet 18, the inflowing milk 50 is centrifugally urged against the inner surface of the inflow chamber 12 and follows a reducing spiral path downwards, thereby slowing and enabling flow calming and the separation of bubbles and foam. The inflowing milk 50 thus accumulates at the bottom of the inflow chamber 12, and any foam floats to the top.

Since the reference sensor 46 of the sensing device 16 is positioned around the bottom edge 40 of the inner wall 24 of the outflow chamber 14, this sensor is entirely and continuously immersed only in the milk 50 and not in any foam. The reference sensor 46 is therefore able to measure the electrical characteristics of the milk 50 relative to the Earth ring member 48. Using a differential measurement method, the measuring sensors 44 can then be calibrated based on the relationship between the measuring sensors 44 and the immersed reference sensor 46. The calibration values are then stored in the memory of the electronic circuitry.

The elongate slits 30 act to reduce flow errors and are of limited dimensions so that a head of milk 50 is formed in the inflow chamber 12 and the throughflow chamber 28. The milk 50 flows around the bottom edge 38 of the outer wall 26 of the outflow chamber 14 and into the throughflow chamber 28 before then flowing through the elongate slits 30, past the wire measuring sensors 44, and out through the fluid outlet 32.

Any bubbles formed by the milk 50 are discouraged from flowing into the throughflow chamber 28, and thus through the elongate slits 30, due to the frusto-conical shapes of the inflow and throughflow chambers 12 and 28 and the position of the third fluid inlet 42. These bubbles tend to migrate towards the outer surface of the outer wall 26 of the outflow chamber 14, and then flow upwardly towards the surface of the milk 50 in the inflow chamber 12 to form foam. If the amount of foam rises above the rim 34 of the outflow chamber 14, it overflows through the opening 36 and down to the fluid outlet 32, completely bypassing, and thereby not having an effect on, the measuring sensors 44.

The driven measuring sensors 44, because they are positioned downstream of the elongate slits 30 and directly in the flow path, only return data based on the extent they are covered by the fluid flowing through the elongate slits 30, and not simply the height of the fluid in the first and throughflow chambers 12 and 28. The electronic circuitry sequentially scans and measures, typically at several hundred times per second, the response generated between the measuring sensors 44 and the Earth ring member 48 in contact with the flowing milk 50. Since the extent of the measuring sensors 44 covered by the milk is proportional to the fluid flow, a corresponding flow value is generated by the electronic circuitry.

A single measuring sensor could be used if the properties of the fluid are known and stable. The reference sensor 46 enables on-line compensation when fluid electrical characteristic variations occur.

More than one reference sensor could be utilised, if the fluid comprises multiple phases. For example, a further reference sensor could be suitably positioned to be, in use, covered by the foam.

Furthermore, although the elongate reference sensor is coiled, providing it is in use entirely and continuously immersed, it could take any suitable arrangement or position.

The inflow, outflow, and/or throughflow chambers could be cylindrical or substantially cylindrical, or of any other suitable shape.

Although the flow meter is described with reference to monitoring milk flow rate, it could be utilised for a single phase fluid, and a multiple phase fluid, such as a bi-phase fluid, which can be separated by density and resolved by differences in the electrical characteristics. Examples of such bi-phase fluids are air/water, air/milk, and oil/water.

Furthermore, although the measurement method described is a differential method between the reference sensor and the measuring sensors, other methods could be used. For example, an absolute calibration of the measuring sensor impedances against a known external reference, such as a stable electrical network, could be used; differential measurement between a number of reference sensors and a calibrated value to return a value proportional to the properties of the fluid and from which changes in the fluid may be compensated for, may be used; or a ratiometric measurement between the measuring sensors and the reference sensor to return a value proportional to the fluid profile with height, from which the mass flow can be derived, could be used. This latter method can also be used to calibrate against simultaneous load measurements, and thus the fluid density can be calculated.

The flow meter could operate without the outer wall of the outflow chamber, i.e. the throughflow chamber, if only a single phase fluid were to be measured, or if the flow readings being influenced by bubbles and foam passing over the measuring sensors was unimportant.

It is thus possible to provide a flow meter which has no mechanically moving parts, is not dependent on the specific gravity and viscosity of the milk, and the readings from which are not impacted by entrained air, surface tension of the milk, or foaming. Furthermore, because a high impedance measurement method is being used to measure the fluid, the power consumption of the flow meter is significantly reduced.

The embodiment described above is given by way of example only and further modifications will be apparent to persons skilled in the art without departing from the scope of the invention as defined by the appended claims.

What is claimed is:

1. A flow meter comprising an inflow chamber having a first fluid inlet, an outflow chamber housed in the inflow chamber and having a second fluid inlet, which is in fluid communication with the inflow chamber, and a fluid outlet by which fluid can drain from the outflow chamber, and a sensing device having an elongate sensor which is positioned at, or adjacent to and downstream of, the second fluid inlet, the second fluid inlet being of limited dimensions so that, in use, a head of fluid is formed in the inflow chamber and the flow rate of the fluid passing through the second fluid inlet is monitored based on the extent of the elongate sensor which is covered by the fluid.

2. A flow meter as claimed in claim 1, wherein the elongate sensor is a wire sensor.

3. A flow meter as claimed in claim 1, wherein the elongate sensor is a strip sensor.

4. A flow meter as claimed in claim 1, wherein the outflow chamber comprises a plurality of the said second fluid inlets and one said elongate sensor is positioned at, or adjacent to, each said second fluid inlet.

5. A flow meter as claimed in claim 1, wherein the or each second fluid inlet is an elongate slit, which extends in the direction of the longitudinal extent of the outflow chamber.

6. A flow meter as claimed in claim 1, wherein the outflow chamber has spaced parallel inner and outer surfaces between which a throughflow chamber is formed, the second fluid inlet(s) being formed in the inner surface and a third fluid inlet, through which fluid can enter the throughflow chamber, being formed adjacent to the bottom edge of the outer surface.

7. A flow meter as claimed in claim 1, wherein the outflow chamber includes a foam overflow inlet in its top surface which bypasses the or each elongate sensor.

8. A flow meter as claimed in claim 1, wherein the inflow chamber is frusto-conical, tapering in a downwards direction.

9. A flow meter as claimed in claim 1, wherein the outflow chamber is frusto-conical, tapering in an upwards direction to, in use, encourage bubbles in the said fluid in the inflow chamber to move upwards to the surface of the fluid and not to pass through the second inlet.

10. A flow meter as claimed in claim 1, wherein the first fluid inlet of the inflow chamber is positioned tangentially or substantially tangentially relative to the inner surface of the inflow chamber so that, in use, fluid flow follows a centrifugal spiral or substantially spiral path on entering the inflow chamber.

11. A flow meter as claimed in claim 1, wherein a further elongate sensor is provided as a reference sensor which, in use, is entirely and continuously immersed in the fluid.

12. A flow meter as claimed in claim 1, wherein the sensing device includes energising means for driving the or each elongate sensor, and electronic circuitry for monitoring the electrical characteristic of the or each elongate sensor.

13. A flow meter as claimed in claim 12, wherein the electronic circuitry monitors the capacitive impedance, capacitance and/or conductance of the fluid based on the electrical response of the or each elongate sensor.

14. A flow meter as claimed in claim 11, wherein each elongate sensor is driven sequentially to prevent or limit interference therebetween.

15. A flow meter as claimed in claim 12, wherein the energising means outputs an alternating current, and the impedance of the sensing device is matched to that of the fluid being monitored.

* * * * *